United States Patent [19]

Miller et al.

[11] 4,375,427

[45] Mar. 1, 1983

[54] THERMOPLASTIC CONDUCTIVE POLYMERS

[75] Inventors: Granville G. Miller, Morristown; Dawn M. Ivory, Stanhope; Lawrence W. Shacklette, Maplewood; Ronald R. Chance, Morris Plains; Ronald L. Elsenbaumer, Morristown; Ray H. Baughman, Morris Plains, all of N.J.

[73] Assignee: Allied Corporation, Morris Township, Morris County, N.J.

[21] Appl. No.: 241,953

[22] Filed: Mar. 9, 1981

Related U.S. Application Data

[63] Continuation-in-part of Ser. No. 103,125, Dec. 13, 1979, abandoned.

[51] Int. Cl.$^3$ .......................... H01B 1/02; H01B 1/06
[52] U.S. Cl. ................................... 252/512; 429/213; 252/500; 252/518
[58] Field of Search ............... 429/213; 252/500, 512, 252/518, 63.7; 928/901; 357/8, 15; 260/37 R, 37 M

[56] References Cited

U.S. PATENT DOCUMENTS

| | | | |
|---|---|---|---|
| 3,354,129 | 11/1967 | Edmonds et al. | 252/63.7 |
| 4,204,216 | 5/1980 | Heeger et al. | 252/500 |
| 4,222,903 | 9/1980 | Heeger et al. | 252/500 |
| 4,321,114 | 3/1982 | MacDiarmid et al. | 429/213 |

OTHER PUBLICATIONS

Montaudo et al., J. of Polymer Science, Polym. Phys. Ed. 11, 65–79, p. 77 (1973).
Montaudo et al., J. of Polymer Sci., Polym. Chem. Ed. 12, 2881–2889 (1974).
Modern Plastics Encyclopedia, McGraw-Hill, Inc., 1978–80m pp. 116, 118.

*Primary Examiner*—Donald L. Walton
*Attorney, Agent, or Firm*—Alan M. Doernberg; Gerhard H. Fuchs

[57] ABSTRACT

An electrically conductive polymer, doped with at least one electron acceptor or electron donor, which polymer has a main chain of arylene units and interspersed regularly or irregularly between them one or more chalcogen atoms or groups of such atoms, especially sulfur and/or oxygen atoms; especially poly(p-phenylene sulfide) doped with an arsenical doping agent. These doped polymers have utility similar to semiconductors or to metals, particularly where light weight is desired, for example in battery electrodes.

20 Claims, No Drawings

THERMOPLASTIC CONDUCTIVE POLYMERS

This application is a continuation-in-part of our copending application Ser. No. 103,125 filed Dec. 13, 1979 (abandoned), and incorporated by reference the entire disclosure thereof except to the extent, if any, that the same may be inconsistent herewith.

BACKGROUND OF THE INVENTION

This invention relates to conductive polymers having conductivity of at least $10^{-7}$ reciprocal ohm-cm at 25° C., both of the semiconductor type and of the metal type.

Largely insulating polymers are broadly known having conductivities (300° K.) ranging from about $10^{-30}$ to $10^{-10}$ reciprocal ohm-cm (Polymer 9 159–172 (1968)).

Moreover conductive polymers are known, in particular as obtained from polyacetylene, which can be semiconducting or metallic, using various electron acceptor or also electron donor dopants such as particularly arsenic pentafluoride (electron acceptor) and potassium (electron donor).

More recently, some of us have discovered such conductive polymers obtained from poly(para-phenylene) containing dopants as used for polyacetylene. (U.S. application Ser. No. 022,237 now abandoned of D. M. Ivory et al. filed Mar. 20, 1979 and the continuation-in-part thereof, Ser. No. 234,511 filed Feb. 17, 1981.

Recently also, conductive polymers obtained by electrolytically oxidizing a mix of pyrrole monomers to form polypyrrole copolymers have been reported (Physics Today, Sept. 1979, pg. 21, ref. 7: K. Kanazawa et al., J.C.S. Chem. Comm. 397 (1980). The conductivity of these copolymers is stated to vary by five orders of magnitude, to metallic conductivities, without use of a separate doping process.

Although the above noted polyacetylene and poly(-para-phenylene) polymers are obtainable as linear rather than network polymers, they are insoluble and infusible. This may be because their conjugated structure results in a comparatively stiff main chain so that conventional polymer processing to provide shaped articles is not possible except by compression of particles into a shape, followed by sintering to consolidate the particles in the desired shape.

What is needed in the art is a plastic both capable of melt or solution processing into shaped articles and transformable into a conducting complex melt-or solution-processible polymer, susceptible to being doped to impart semiconductor and/or metallic conductor properties. The resulting conductive articles should have utility in the fields of lightweight antistatic materials, electromagnetic shields, electrostatic shields, electrical conduits, electroplatable substrates, optically or capacitatively readable information storage materials, conductive paints, conductive adhesives, electrodes for photochemical reactions, battery electrodes; and in general could be used similarly to semiconductors and metals to produce various electronic devices. The present invention is directed to meeting the foregoing and other needs of the art.

SUMMARY OF THE INVENTION

This invention provides an electrically conductive organic polymeric composition comprising at least one thermoplastic or solvent processible polymer and at least one electron acceptor and/or electron donor dopant which polymer has (1) a main chain consisting essentially of arylene units and (2) interspersed between arylene units therein, regularly or irregularly along the chain, one or more chalcogen atoms or groups of such atoms, especially sulfur atoms and/or oxygen atoms; said composite having conductivity at 25° C. of at least $10^{-7}$ reciprocal ohm-cm; and preferably at least $10^{-3}$ ohm$^{-1}$cm$^{-1}$. The chalcogen atom such as sulfur can be one atom of thiophene ring fused at its 2, 3 and 4, 5 carbon atoms between two benzene rings, as in poly(-benzothiophene).

It is quite unexpected and surprising that when the conjugated arylene units of the polymer chain are interrupted by atoms or groups of atoms such as oxygen and sulfur interspersed along the chain between the arylene units, the polymer would still be capable of being made conductive by use of a dopant, since the continuous system of overlapping carbon "pi" orbitals, as formed by conjugation along the chain, would be interrupted by such intruding atom or group of atoms. Possibly the usefulness of the present doped polymers as conductive materials is due to some interaction between the outer electrons surrounding the atoms such as sulfur and oxygen with the pi electrons in the conjugated bonds and with the dopant; but we do not intend to be bound by any theory of our invention.

A particular utility of our doped polymers is as an electrode in an electrical battery, because of the light weight and high voltage thereby provided.

Preferred doping agents are the arsenical agents such as arsenic halides.

DETAILED DESCRIPTION POLYMERS

It will be appreciated that various repeating arylene units can compose the main chain of the polymers of this invention, such as para- and meta-phenylene units, biphenylene units, naphthylene units, substituted arylene units such as meta-phenylene units having a substitutent in the 5-position, and many others. Preferred polymers are based on unsubstituted para-phenylene units as the arylene units of the polymers of this invention, in view of the availability and suitability of these polymers for the present purposes.

The chalcogen atoms along the polymer chain between the repeating arylene units can be single atoms of oxygen or sulfur or other chalcogen, or chains of such atoms, as in polysulfides, or combinations of such atoms such as in a sulfoxide group. Representative polymers useful as starting polymer for purposes of this invention are:

(1) Polyphenylene sulfide (para-isomer), $(p-C_6H_4S)_n$. The main chain arylene units are paraphenylene, and the chalcogen atoms are single -S- atoms. The polymer is commercially available from various sources and is described in Modern Plastics Encyclopedia 1979–80 at pages 80, 82.

(2) Polyphenylene sulfide (meta-isomer), $(m-C_6H_4S)_n$. The main chain arylene units are metaphenylene, and the chalcogen atoms are single -S- atoms. The polymer is known (U.S. Pat. No. 3,354,129 of Nov. 21, 1967 to J. T. Edmonds, Jr. et al.).

(3) Also described in this U.S. Pat. No. 3,354,129 are monomethyl and dimethyl substituted poly(p-phenylene sulfides), which also are useful starting materials for purposes of this invention.

(4) Polyphenylene oxide (para-isomer), $(p-C_6H_4O)_n$. The main chain arylene units are paraphenylene, and the chalcogen atoms are single -O- atoms. See Example 11 below.

(5) Poly(para-phenoxyphenyl sulfide), (p-C$_6$H$_4$S C$_6$H$_4$O)$_n$. The main chain arylene units are para-phenylene, and the chalcogen atoms are single -S- atoms and single -O- atoms. Synthesis of this polymer has been described by G. Montaudo, G. Bruno, P. Maravigha, P. Finocchiaro, and G. Centineo in J. of Polymer Science, Polym. Phys. Ed. 11, 65–79 page 77 (1973, John Wiley and Sons, Inc.).

(6) Poly(para-phenylene disulfide), (p-C$_6$H$_4$SS)$_n$. The main chain arylene units are paraphenylene and the chalcogen atoms are pairs of sulfur atoms, -SS-. Its synthesis is described by G. Montaudo et al. in J. of Polymer Science, Polym. Chem. Ed. 12 2881-9 (1974, John Wiley and Sons, Inc.).

(7) Polyethersulfone, (p-OC$_6$H$_4$SO$_2$C$_6$H$_4$)$_n$. The main chain arylene units are p-phenylene, and the chalcogen atoms are -O- and -SO$_2$-. (Modern Plastics Encyclopedia 1979-80, p. 116; McGraw-Hill, Inc.).

(8) Poly(4'-sulfinylphenyl-4-thiophenyl), (OSC$_6$H$_4$SC$_6$H$_4$)$_n$. The main chain arylene units are p-phenylene, and the chalogen atoms are (S=O) and S. (U.S. Pat. No. 3,354,129 cited above).

(9) Poly(thio-2,8-dibenzothiophenenediyl) and poly(thio-3,7-dibenzothiophenediyl) of Examples 17 and 22 below, which undergo doping and, at least for the 2,8 form, intramolecular crosslinking by action of a strong Lewis acid such as AsF$_5$ to form novel polymers.

Mixtures of the above polymers with each other or with other materials can be used; and more particularly, polyblends (polymeric "alloys") including the above polymers can be used to obtain polymers with easier processability and/or with other modified properties. For example polyblends of polyphenylene sulfide with the commercially available polyimide from benzophenone tetracarboxylic dianhydride and mixed aromatic diisocyanates, such as "Polyimide 2080" of Upjohn Co., can be used in this invention. Moreover, the polymers can be reinforced or filled to modify their properties, e.g. with fibers such as glass, asbestos or metal fibers; or with mineral fillers such as mica, titania and wollastonite; or with carbon black or graphite, or with a heat-stable organic material such as polytetrafluoroethylene.

One type of added material, useful for controlling the conductivity, is a chemical compensator of the dopant. Another type is represented by arsenic trifluoride used as a pretreating agent with the effect of increasing the polymer plasticity and permeability to AsF$_5$ dopant. Preferred polymers are those containing sulfur in the main chain between the arylene units and especially poly(para-phenylene sulfide).

The polymers used in this invention can be shaped by powder techniques or by melt processing, e.g. by molding, extruding, or spinning into fibers. Also certain of these polymers can be solution cast to produce films and coatings.

The resulting shaped articles containing dopant added before, during, or after the shaping process can be used in products with antistatic properties such as floor coverings, wall coverings, draperies, apparel; in protection against static emissions, for example in housings for computers which otherwise might be subject to malfunctions ("glitches") due to static discharges; in electrical shielding, e.g. to separate the conductor core in high voltage cables from the insulator layer; in electrical conduits to obtain flexibility and/or to fabricate complex shapes; in heating elements, heating pads and the like where a selected level of electrical resistance is desired; in objects intended to be electroplated, to facilitate the plating process; in systems for optically or capacitatively readable information storage such as audiovisual recordings read by capacitance difference between the pickup head and the signalbearing surface; as conductive coatings, paints or adhesives e.g. for use with metals; as electrodes resistant to corrosion; as battery electrodes; in semiconductor devices; in devices requiring absorption of electromagnetic radiation such as solar energy collectors; and in general wherever a semiconductor or metallic conductor with the properties of a plastic is desired.

DOPING

The resulting shaped article can be doped in the usual manner, by exposure to the vapor of the dopant or by exposure to a solution of the dopant; or by electrochemical means (J.C.S. Chem. Comm. 1979, p. 594–5; Nigrey, MacDiarmid and Heeger). Since generally the dopants ae susceptible to deterioration by moisture or oxygen, the polymer should be thoroughly dried, and the doping should be in an atmosphere of the dopant or dopant diluted by an inert atmosphere or in a solution largely free of water. Nevertheless, doped articles of the invention have moderate stability toward air so that for some purposes they can be used without special precautions to protect the dopant from deterioration. For example, if used for forming metal coated plastic articles, the doped plastic of the invention can be used without protection against exposure to air, because as the coating with metal proceeds, the metallic coating takes over the protection of the underlying polymer. More generally, the polymers can be formed into the desired shape and placed in a desired electronic device under a protective atmosphere which is maintained present in the device, or the device is encapsulated in an inert coating such as plastic.

Dopants heretofore known for producing conductive polymers can be used for the present polymers; in particular Lewis acids (such as arsenic pentafluoride) as electron acceptor (p-type dopant) and alkali metals as electron donors (n-type dopant); however, the effectiveness of dopants for purposes of this invention does not necessarily follow the same order for all polymers useable in the invention nor the same as for polymers used in prior art. Representative dopants which can be used include the alkali metals lithium, sodium, potassium, rubidium, cesium; Lewis acids such as halides of boron, antimony, arsenic; sulfuric acid, perchloric acid; halogens such as chlorine; and other electron donors and electron acceptors.

EXAMPLES

The examples which follow are illustrative of our invention and of the best mode contemplated by us for carrying out the invention but are not to be interpreted as limiting.

EXAMPLE 1

This example describes the doping of poly(p-phenylene sulfide) ("PPS") with the electron acceptor AsF$_5$, to produce a highly conducting material. PPS (filled) is shown as having conductivity of about $10^{-16}$ or $10^{-15}$ reciprocal ohm-cm (Phillips Chemical Co., Technical Service Manual TSM-266, Table at page 2).

About 0.1 g of poly(phenylene sulfide) ("PPS") obtained from Polysciences, Inc., Warrington, Pa., was pressed at room temperature and 830 MPa (120,000 psi) into a disk-shaped pellet 13 mm in diameter and 1 mm in thickness. Four electrodes of 36 gauge platinum wire were connected to the flat surface of the disk with conductive graphite cement (available as "Electrodag") at 1 mm linear spacings.

The sample was placed into a "Pyrex" borosilicate glass cell especially constructed to allow evacuation and introduction of dopants. The platinum wires were passed through glass-metal seals to permit continuous monitoring of electrical conductivity throughout the doping experiment, by the standard four-probe technique of J.A.C.S. 100 1014–16 (1978). The two outer electrodes were connected to a direct current source (Keithley Model 225). The center wires were connected to an electrometer (Keithley Model 616) for voltage measurement. This arrangement permits continuous monitoring of the voltage and current, whereby electrical conductivity can be calculated by Ohm's Law.

The conductivity cell and sample were evacuated to about $5.0 \times 10^{-6}$ torr ($6.66 \times 10^{-4}$ Pa) ($6.7 \times 10^{-7}$ kPa) overnight. At this point, prior to introducing dopant, conductivity for the pellet was about $10^{-16}$ ohm$^{-1}$ cm$^{-1}$ (Proceedings of 34th Annual Technical Conference of Society of Plastic Engineers 22, p. 141, 1976).

AsF$_5$ was introduced at initial pressure of 100 torr (13.3 kPa), which was raised to 350 (46.6 kPa) torr and held there for about 36 hours. During doping the pellet changed from a light tan color to a green, then dark green, and finally black color. Conductivity rose from about $10^{-16}$ ohm$^{-1}$ cm$^{-1}$ to $8.4 \times 10^{-2}$ ohm$^{-1}$cm$^{-1}$ during the first 24 hours of exposure. After 30 hours conductivity had leveled out at 0.15 ohm$^{-1}$cm$^{-1}$. When the sample was placed under vacuum maintained by pumping, its conductivity increased gradually to a value of 0.49 ohm$^{-1}$ cm$^{-1}$ after 3 hours.

An elemental analysis of a sample of powdered PPS doped in the same manner indicated a composition, $[C_6H_4S(AsF_5)_{0.66}]_x$.

EXAMPLE 2

This example describes the preparation of a highly conducting material by treatment of poly(p-phenylene sulfide) with an electron donor, potassium.

Commercially obtained poly(phenylene sulfide) powder was pressed at room temperature and 830 MPa (120,000 psi) to form a 12.7 mm diameter $\times$ 1.5 mm thick pellet. This pellet was placed in one end of a "Pyrex" borosilicate glass tube and potassium in the other end. This tube was evacuated to $10^{-6}$ torr ($1.33 \times 10^{-4}$ Pa) and sealed off with a torch. It was then placed in a two-stage furnace with the sample end of the tube at 310° C. and the potassium end at 260° C. for 5 hours.

The tube was allowed to cool to room temperature then transferred to an argon filled glove box. The conductivity of the sample was measured in the glove box using a Jandel Engineering Ltd. four-point probe apparatus and a Keithley voltmeter and current source. The conductivity measured was $1.06 \times 10^{-3}$ ohm$^{-1}$cm$^{-1}$.

EXAMPLE 3

This example demonstrates that exposure of the potassium doped poly(p-phenylene sulfide) to hydrogen gas yields a substantial increase in conductivity.

The pellet of poly(p-phenylene sulfide) from Example 2 with a conductivity of $1.06 \times 10^{-3}$ reciprocal ohm-cm was placed in a "Pyrex" glass tube and evacuated to $10^{-6}$ torr ($1.33 \times 10^{-4}$Pa). One-half of an atmosphere (50.66 kPa) of hydrogen gas was added to the tube, which was then immersed in a 50° C. water bath for 4 days. The tube was then removed, evacuated and transferred to the argon filled glove box where the conductivity of the pellet was measured at $9.38 \times 10^{-2}$ reciprocal ohm-cm.

EXAMPLE 4

This example demonstrates that amorphous films and fibers of poly(p-phenylene sulfide) can be doped to high conductivities with AsF$_5$ gas. A 1-mil thick clear transparent film of poly(p-phenylene sulfide) was obtained from Phillips Chemical Co. under the designation PPS-79-848. The amorphous nature of this film was indicated by its transparency and was verified by comparison of infrared measurements made on annealed and unannealed samples according to the method used by D. G. Brady (J. Appl. Poly Sci. 20, 2541 (1976)).

A portion of this film was cut in the shape of a 1-cm diameter disk. Four platinum wires were attached to the periphery of the disk with graphite cement ("Electrodag"), according to the method of L. J. van der Pauw for obtaining conductivity measurements on lamellae (Phillips Tech. Rev. 20(8), 220 (1958/59)).

This sample was then mounted in a glass vacuum cell and exposed at room temperature to 400 torr (53.2 kPa) AsF$_5$. Within seconds the sample began a rapid rise in conductivity. At the same time the sample when viewed by transmitted light became a slate blue color. With time this coloration grew increasingly dark until the sample became completely opaque and appeared in reflected light as glossy black. The electrical conductivity rose steadily over a 24-hour period eventually reaching a nearly constant value of just over one reciprocal ohm-cm.

A similar experiment was performed on a 1-mil diameter PPS fiber obtained from Phillips Chemical Co. under the designation PPS-79-807. The fiber was mounted on a glass slide with "Electrodag" graphite cement at four nearly equally spaced points along its length. Electrical contact was made at these points, the outer two being connected to a Keithley Model 225 constant current source and the inner two being connected to a Keithley Model 616 electrometer. The sample was mounted within the same glass vacuum cell used previously in Example 1 and exposed to 200 torr (26.6 kPa) AsF$_5$. The polyphenylene sulfide fiber underwent doping much more rapidly than the film or the pressed pellets. An ultimate conductivity of 0.8 ohm$^{-1}$ cm$^{-1}$ was reached after only 5 hours exposure at room temperature to AsF$_5$.

EXAMPLE 5

The following describes the doping of melt molded poly(p-phenylene sulfide) with AsF$_5$ and the effects of crystallinity.

Three meld molded (300° C.) plaques of poly(p-phenylene sulfide) were prepared. Each was 1.3 cm in diameter by 0.25 mm thick. One was quick quenched from the mold and was essentially amorphous. Another was quick-quenched, then annealed at 170° C. for 1.5 h. A third was quick-quenched and then annealed at 170° C. for 20 h to produce a highly crystalline polymer. Four platinum electrical leads were attached to each plaque with "Electrodag" graphite cement. These plaques were then placed into a 150 mL glass tube and connected to a vacuum line. The system was evacuated to $10^{-5}$ torr ($1.33 \times 10^{-3}$ Pa) then repressurized with gaseous AsF$_5$ to 456 torr (60.8 kPa). The plaques acquired a blue-black sheen almost immediately. They were allowed to remain under AsF$_5$ gas for 48 h. After this time the reaction tube was evacuated to $10^{-4}$ torr ($1.33 \times 10^{-2}$ Pa) for 2 h.

The plaques were removed from the tube in a dry box under Ar. The conductivity of the amorphous plaque was $8.96 \times 10^{-5}$ ohm$^{-1}$cm$^{-1}$; for the partially annealed plaque was $8.12 \times 10^{-4}$ ohm$^{-1}$cm$^{-1}$; and for the highly crystalline plaque was $5.52 \times 10^{-4}$ ohm$^{-1}$cm$^{-1}$. These samples appeared to be only lightly doped with AsF$_5$.

EXAMPLE 6

This example describes the fabrication of a Schottky barrier diode with heavily doped (AsF$_5$) poly(p-phenylene sulfide) ("PPS") functioning as the metal and p-type gallium phosphide (GaP) as the semiconductor.

A rectangular bar of PPS was obtained by compressing at room temperature commercially obtained powder of PPS ("Ryton" available from Phillips Chemical Co.) under a pressure of 830 MPa. Two contacts were made to one end of this bar with graphite cement and platinum wires. The bar was then doped under a pressure of 400 torr (53.2 kPa) of AsF$_5$ for 24 hours as in Example 1. The graphite contacts were found to be ohmic with a resistance of approximately 40 ohms each. A rectangular bar of GaP was also prepared with an ohmic contact on one side. The two bars were clamped together between the jaws of a vise held within a dry argon atmosphere. The area of contact was rectifying having a leakage current of 7 nA at a reverse bias of 3 volts and a current of 0.8 mA at a forward bias of 3 volts. Standard analysis (per the method of S. M. Sze "Physics of Semiconductor Devices" John Wiley & Sons, 1969) of the current-voltage characteristic indicated an effective series resistance of 250 ohms and that the doped PPS produces a band-bending potential of approximately 0.9 V. Capacitance-voltage measurement gave a similar result (0.85 V). This band bending results from the metallic nature of the conductivity of this doped PPS and is evidence of such metallic nature.

Since the valence band of GaP lies at 6.24 eV with respect to vacuum, the work function of metallic doped PPS is 5.4 eV, a value comparable to those of the most electronegative elemental metals such as gold; and accordingly the metallic doped PPS can replace such metals in Schottky barrier and other electronic devices.

EXAMPLE 7

The following example demonstrates that the PPS polymer becomes a strong IR absorber on doping with AsF$_5$ and that the IR absorption can be eliminated by chemical compensation of the dopant.

Using a Perkin-Elmer Model 727 infrared spectrophotometer, an IR spectrum was taken for a 1-mil (0.025 mm) thick film of poly(p-phenylene) sulfide described in Example 4. This film was then lightly doped with AsF$_5$ so that it appeared blue in transmitted light. The film was then mounted in a vacuum sealed IR cell equipped with nonreactive AgCl windows. The IR spectrum of this lightly doped film still showed the prominent vibrational transitions of the undoped PPS film with the addition of one sharp peak near 700 cm$^{-1}$ which is attributable to the formation of AsF$_6^-$ anions (K. O. Christe and A. E. Pavlath, Z. anorg. allg. Chem. 335, 210 (1965)). In addition, the doped polymer exhibited a broad IR absorption (down to at least 2000 cm$^{-1}$). The absorption results from the presence of free charge carriers, as indicated by the disappearance of this absorption when the electrical conductivity of the doped polymer was sharply reduced by compensation with dimethylamine, (CH$_3$)$_2$NH. Such capacity for IR absorption makes the doped polymer useful in devices for converting solar energy into heat and in IR shielding applications.

EXAMPLE 8

A disk-shaped pellet of poly(p-phenylene sulfide), prepared as in Example 1, was placed in a "Pyrex" borosilicate glass tube which was then evacuated to $10^{-6}$ torr ($1.33 \times 10^{-4}$ Pa). At pressure of one atmosphere, (101 kPa), chlorine gas was added to the tube. The tube was then sealed off with a torch and placed in a 225° C. furnace for 18 hours; then it was transferred to an argon filled glove box where it was opened. The conductivity of the chlorine-doped pellet was measured at 7.9 ohm$^{-1}$cm$^{-1}$.

EXAMPLE 9

The following example demonstrates that an iodine solution does not quickly form a highly conducting complex with poly(p-phenylene sulfide).

A 13 mm diameter $\times$ 1.5 mm thick pellet was prepared by pressing at room temperature commercially obtained powder of poly(p-phenylene sulfide) at 830 MPa (120,000 psi) as in Example 1. The pellet was weighed and placed in a concentrated solution of iodine in hexane, which was stirred for several hours in a nitrogen filled glove bag. The pellet was then rinsed in hexane, dried, weighed, and its conductivity measured as in Example 1. Although there was a 6.89% increase in weight of the pellet, there was at most only a small increase in conductivity to not above $10^{-7}$ reciprocal ohm-cm (the lowest value measurable with the instrument used).

EXAMPLE 10

The following example demonstrates that the meta configuration of polyphenylene sulfide forms a highly conducting complex.

Powdered poly(m-phenylene sulfide), prepared according to the method of J. T. Edmonds, Jr. and H. W. Hill, Jr., U.S. Pat. No. 3,354,129 of November 21, 1967, was pressed as in Example 1 into a pellet 13 mm in diameter by 1 mm thick (weight=0.1624 g). This was placed into a 50 mL reaction tube as used in Example 8.

The tube was evacuated to $10^{-5}$ torr ($1.33 \times 10^{-3}$ Pa) and then pressurized at room temperature with AsF$_5$ to 428 torr (56.9 kPa). The pellet turned a green-blue color almost immediately. After 20 min. it became black. The pellet remained under the AsF$_5$ atmosphere for 3.75 h. The tube was then evacuated to $10^{-5}$ torr ($1.33 \times 10^{-3}$ Pa) for 1 h.

The conductivity of the pellet was measured in a dry box under Ar by the four probe technique as in Example 1. It showed a conductivity of $1.31 \times 10^{-2}$ ohm$^{-1}$cm$^{-1}$. The final weight of the pellet was 0.3830 g; therefore, it absorbed 0.2206 g AsF$_5$ (1.30 mmol). The mole ratio of phenylene sulfide units to As atoms is 1.16:1.

EXAMPLE 11

The doping of poly(p-phenylene oxide) with an electron acceptor, AsF$_5$, gives a highly conducting material.

Powdered poly(p-phenylene oxide), prepared according to the method of H. M. van Dort, C. A. M. Hoefs, E. P. Magre, A. J. Schopf, and K. Yntema, *European Polymer Journal* 1968, 4, 275–287, was pressed as in Example 2 into a pellet 13 mm in diameter by 1 mm thick (weight 0.1615 g). This pellet was placed into a 50 mL reaction tube as used in Example 8.

The tube was evacuated to $10^{-5}$ torr ($1.33 \times 10^{-3}$ Pa) then pressurized at room temperature with AsF$_5$ gas to 428 torr (56.9 kPa). The pellet turned brown then black in a short period of time. After 20.75 h the tube was evacuated in 1 hr to $10^{-5}$ torr ($1.33 \times 10^{-3}$ Pa), then the conductivity of the pellet was measured as in Example 1 in a dry box under Ar.

The conductivity was found to be $2.3 \times 10^{-4}$ ohm$^{-1}$cm$^{-1}$. This sample was only lightly doped; the uptake of AsF$_5$ was 36.1 mg. Visual inspection revealed that only the surface of the pellet was doped (blackened) by AsF$_5$. The thickness of this surface layer was measured with a micrometer as 0.2 mm, implying that the doped portion of the sample has a conductivity of $1.2 \times 10^{-3}$ ohm$^{-1}$cm$^{-1}$.

EXAMPLE 12

This example describes the doping of polysulfone resin with the electron acceptor AsF$_5$ to produce a material having increased conductivity.

One gram of poly(phenyl sulfone), obtained as extruded pellets from Polysciences, Inc. and precipitated twice from dichloromethane, was placed in a "Pyrex" tube and evacuated to a pressure of $5.0 \times 10^{-6}$ torr ($6.66 \times 10^{-4}$ Pa). At this point, the polymer is an insulator.

The cream-colored powder was exposed to AsF$_5$ at a pressure of 400 torr (53.2 kPa) for 16 hours. During that time, the cream-colored solids turned to a light green which then deepened to a very dark green. At the end of 16 hours, excess AsF$_5$ was removed under vacuum and the solids taken into a drybox under an argon atmosphere. A small portion of the solids was ground to a fine powder and pressed in a Barnes Engineering pellet press for infrared analysis of samples in KBr. The conductivity of this pellet, measured as in Example 1, was found to be $10^{-6}$ ohm$^{-1}$cm$^{-1}$.

EXAMPLE 13

Preparation and Doping to form highly conducting poly(2,5-dimethyl-phenylene sulfide).

(a) Preparation of the polymer: Poly(2,5-dimethylphenylene sulfide) was prepared according to the method of J. T. Edmonds and H. W. Hill, Jr., U.S. Pat. No. 3,354,129 to Phillips Petroleum Co., 1967.

Into a 1 L steel bomb was placed 20.018 g (144.3 mmoles) of 2,5-dichloro-1,4-dimethylbenzene (commercially available from Aldrich Chem. Co.), 27.46 g (114.3 mmoles) of sodium sulfide nonahydrate, and 150 mL of distilled N-methylpyrrolidinone. The bomb was sealed and heated to 250° C. for 17 h. The bomb was cooled and the reaction mixture poured into 500 mL of acetone in a blender. The precipitated polymer was washed (4×500 mL H$_2$O, 3×500 mL acetone in a blender) and then extracted with hot THF (Soxhlet) for 40 h. The extracted polymer was dried in a vacuum oven at 120° C. and 1 torr (0.133 kPa) to give 7.5 g of poly(2,5-dimethylphenylene sulfide). Calc: 70.60%C, 5.88%H, 23.51%S; Found: 68.55% C, 5.94%H, 21.20%S, 3.36%Cl.

DP=ca.14, T$_m$ 333° C.

Doping:

300 mg of poly(2,5-dimethylphenylene sulfide) from the above preparation was placed into a glass tube and evacuated to $10^{-5}$ torr ($1.33 \times 10^{-3}$ Pa). The powder was exposed to AsF$_5$ gas at 200 torr (26.6 kPa) overnight. Excess AsF$_5$ was pumped off under vacuum for 3 h. The doped powder was pressed into a pellet using a pellet press as for KBr pellets. Its conductivity (4-point probe) was 0.49 ohm$^{-1}$ cm$^{-1}$. The conductive pellet analyzed for: C$_8$H$_{(8.0)}$S$_{0.82}$(AsF$_{6.06}$)$_{0.79}$.

EXAMPLE 14 (COMPARISON)

Preparation and Doping of Poly(2,3,5,6-tetramethylphenylene sulfide).

The polymer was prepared as described above from 1,4-dibromodurene, and was extracted with hot THF for 2 days to give 1.202 g of THF insoluble product. Calc: 73.18%C, 7.31%H, 19.50%S, Found: 70.78%C, 7.14%H, 14.70%S, 5.58%Br.

DP=ca. 16, T$_m$ 325° C. ("DP" is degree of polymerization, i.e. average number of monomeric units in the polymer. "T$_m$" is the polymer melting point).

Into a glass tube was placed 138 mg of the above polymer. The tube was evacuated to $10^{-5}$ torr ($1.33 \times 10^{-3}$ Pa) and slowly pressurized with AsF$_5$ gas to 476 torr (62 kPa) at room temperature. After 12 h. the excess AsF$_5$ was removed by pumping off under vacuum and the doped powder was pressed into a pellet (dry box) which was not very conductive (conductivity less than $10^{-9}$ ohm$^{-1}$ cm$^{-1}$).

EXAMPLE 15

AsF$_3$/AsF$_5$ Doping of melt molded poly(p-phenylene sulfide): Enhancement of the rate and depth of AsF$_5$ penetration into PPS by prior treatment with AsF$_3$.

Into a glass tube fitted with a vacuum stopcock was placed a 1 cm×4 cm×0.025 cm strip of melt molded poly(phenylene sulfide) molded from Ryton® V-1 (Phillips Chemical Co.) at 310° C. and quick-quenched. The tube was connected to a vacuum line and evacuated at $10^{-5}$ torr ($1.33 \times 10^{-3}$ Pa). The tube was then pressurized to 327 torr (43.6 kPa) with AsF$_3$ gas at room temperature. The film was exposed to AsF$_3$ for 4 h. After this time the tube was further pressurized with AsF$_5$ gas to a total pressure of 350 torr (46.7 kPa). The film rapidly turned green-blue then black.

After two days at room temperature the excess AsF$_5$ and AsF$_3$ were pumped off under vacuum. Surprisingly, the film, originally self-supporting, had sagged under its own weight. After 1 day under dynamic vacuum (i.e. pumping), the conductivity of the film was 1 ohm$^{-1}$ cm$^{-1}$.

A sample of the film was embedded in epoxy and cross-sectioned with a glass knife microtome. A 0.025 cm thick slice examined by transmission optical microscopy showed the depth of AsF$_5$ penetration (doping) to be 0.0084 cm (67% doped), and AsF$_3$ penetration to be 0.0121 cm (97% penetration).

Similar poly(phenylene sulfide) samples treated only with AsF$_5$ (4 days, room temperature) showed a maximum depth of penetration into the film of only 0.003 cm. Thus, AsF$_3$ greatly enhances the rate and depth of AsF$_5$ doping in poly(phenylene sulfide) and appears to exhibit a plasticizing effect on the polymer. Moreover, the polymer films treated in this manner show a more favorable retention of mechanical properties than with AsF$_5$ treatment alone.

A pellet ½" (12.7 mm) in diameter×1 mm thick pressed from powdered Ryton V-1 was similarly doped with AsF$_3$ then AsF$_5$ as described above. It showed a final conductivity of 1.15 ohm$^{-1}$cm$^{-1}$. The conductive pellet analyzed for: C$_6$H$_{2.9}$S$_{0.88}$(AsF$_{2.37}$)$_{0.906}$

EXAMPLE 16

Preparation and Doping to form conducting poly(2(3)-methylphenylene sulfide), a copolymer of 2-methyl and 3-methyl substituted poly(p-phenylene sulfides)

Preparation of Polymer: This polymer was prepared according to the method of J. T. Edmonds and H. W. Hill, Jr. (U.S. Pat. No. 3,354,129 to Phillips Petroleum Co, 1967).

Into a 270 mL glass Fisher-Porter pressure bottle was placed 14.67 g (81.12 mmoles) of 2,5-dichlorotoluene, 7.25 g (83.00 mmoles) of anhydrous sodium sulfide, 100 mL of N-methylpyrrolidinone and a magnetic stirring bar. The bottle was sealed and heated to 240° C. for 17 h. with the contents magnetically stirred. The bottle was cooled to room temperature and the reaction mixture was poured into 500 mL of methanol in a blender. The precipitated polymer was washed (3×500 mL methanol, 4×500 mL H$_2$O, and 2×500 mL acetone) and vacuum dried at room temp., 0.1 torr (13.3 Pa) to give 8.3 g of a tan polymer (84% yield). Calc: 68.87%C, 4.91%H, 26.21%S; Found: 68.37%C, 4.88%H, 24.44%S, 1.47%Cl.

DP=19, T$_g$=85° C. (T$_g$ is the glass transition temperature of the polymer).

About 0.1 g of the above polymer was pressed at room temperature and 830 MPa (120,000 psi) into a disk-shaped pellet 13 mm in diameter by 1 mm thick. Four electrodes of 36 gauge platinum were attached to the periphery of the disk with graphite cement ("Electrodag") according the method of L. J. van der Pauw (Phillips Tech. Rev. 20(8), 220 (1958/1959)).

This sample was then mounted in a glass vacuum cell designed for the in situ monitoring of conductivity during doping. The system was evacuated to 10$^{-5}$ torr (1.33×10$^{-3}$ Pa) and repressurized at room temperature with AsF$_5$ gas at 400 torr (53.2 kPa). Within minutes the sample showed a conductivity of 10$^{-6}$ ohm$^{-1}$cm$^{-1}$. After 1 day the excess AsF$_5$ was removed and the pellet's conductivity was 5.5×10$^{-3}$ ohm$^{-1}$cm$^{-1}$.

EXAMPLE 17

Preparation and Doping of poly(thio-2,8-dibenzothiophenediyl), an intramolecularly crosslinked derivative of poly (p-phenylene sulfide) of formula

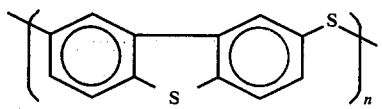

Into a 6 oz (about 200 mL) glass Fisher-Porter pressure bottle was placed 6.111 g (17.865 mmoles) of 2,8-dibromodibenzothiophene (prepared according to the method of C. R. Neumoyer and E. D. Amstutz, J. Am. Chem. Soc. 1947, 69, 1921, mp 224°–224.2° C.), 1.453 g (18.623 mmoles) of anhydrous sodium sulfide, 100 mL of N-methylpyrrolidinone and a magnetic stirring bar. The bottle was sealed and heated to 250° C. for 48 h. with magnetic stirring.

The bottle was cooled to room temperature and the reaction mixture was poured into 600 mL of methanol in a blender. The precipitated polymer was washed in the blender (3×500 mL methanol, 4×500 mL H$_2$O, then 3×500 mL acetone) and dried in vacuo at 60° C., 1 torr (133 Pa) to give 1.77 g of polymer (45% yield). Calc: 67.31%C, 2.80%H, 29.89%S; Found: 67.86%C, 3.06%H, 27.42%S, 1.61%Br.

DP=ca. 22, M$_n$ 4700, T$_g$ 155° C. (M$_n$ is number average molecular weight).

A sample of the powdered polymer (0.27895 g, 1.30 mmoles) was placed in a glass vessel, which was evacuated and cooled to −78° C. AsF$_5$ gas was allowed to condense at a pressure of 200 torr (26.6 kPa) until the polymer was saturated with liquid AsF$_5$. The reaction vessel was maintained at −78° C. for 50 h at which point the AsF$_5$ was removed by pumping it off.

The resulting doped polymer was removed to a drybox where the weight was determined, 0.420 g, implying that 0.83 mmole of AsF$_5$ was taken up by the polymer. A pellet was pressed from the doped powder and the conductivity was determined using a 4-in-line probe. The conductivity was 0.24 ohm$^{-1}$cm$^{-1}$.

Infrared analysis of this material, after doping with AsF$_5$ and compensation with ammonia, indicates that intramolecular crosslinking occurs yielding substantial proportions of poly(benzothiophene) units of formula

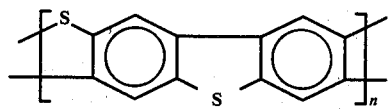

Heavy doping of poly(p-phenylene sulfide) with AsF$_5$ yields essentially identical results.

EXAMPLE 18

Preparation and Doping to form conducting poly(4-sulfinylphenyl-4-thiophenyl) of formula (S(O)C$_6$H$_4$SC$_6$H$_4$)n.

The polymer was prepared from bis(p-chlorophenyl) sulfoxide (Aldrich Chem. Co.) and sodium sulfide according to the method of Edmonds and Hill, U.S. Pat. No. 3,354,129, 1967. Calc. for C$_{12}$H$_8$OS$_2$: 62.08%C, 3.44%H, 27.57%S Found: 61.80%C, 3.46%H, 25.31%S, 2.06%Cl Tg is 129° C.

A sample of the powdered polymer was placed into a glass tube which was then evacuated to 3×10$^{-4}$ torr (4×10$^{-2}$ Pa). The tube was cooled to −78° C. (Dry Ice/Ethanol) and AsF$_5$ gas was slowly introduced until liquid AsF$_5$ wetted the powder. The system was maintained at −78° C. for 4 days after which time the excess AsF$_5$ was pumped off (−78° C., dynamic vacuum).

The powder was compacted into a pellet, 10 mm dia.×1 mm thick, using a press as for KBr pellets. Its conductivity was measured with a 4-point in-line probe as 7.5×10$^{-3}$ ohm$^{-1}$ cm$^{-1}$.

EXAMPLE 19

Construction of a Battery using AsF$_5$ doped PPS as an active cathode.

A cell was constructed inside a dry box with a strip of Li (anode) and a bar of pressed PPS powder (Ryton V-1, Phillips Chemical Co.) doped with AsF$_5$ (cathode). A strip of polypropylene filter paper was used as a separator. This separator was soaked with a solution of KAsF$_6$ in tetramethylene sulfone (TMS). Electrical contact was made with alligator clips and the assembly was held together with an insulating nylon clamp.

An open circuit voltage of 4.7 V was observed and a short circuit current of 1.4 mA/cm². After a 13 minute short circuit discharge, the voltage decreased to 4.1 volts, but essentially recovered its initial value (4.5 volts) after a 14 minute charge cycle, thus demonstrating utility as both a primary and a secondary battery.

EXAMPLE 20

Construction of a Battery using PPS of increased porosity.

A 1.3 cm diameter pellet was pressed from PPS (Ryton VI) powder. This pellet was annealed in a vacuum furnace for 24 h at 220° C. to increase its porosity. A platinum wire was attached with "Electrodag" conductive graphite cement.

The pellet was then doped with AsF$_5$ to a conductivity of 2.7 ohm$^{-1}$cm$^{-1}$. A battery was constructed inside a glass cell. This pellet was used as a cathode, a strip of lithium as an anode and LiBF$_4$ in propylene carbonate as an electrolyte. When the pellet and the lithium were immersed in the electrolyte, an open circuit voltage of 4.44 V was generated. A short circuit current more than double that obtained per Example 19 was observed, 3.1 mA/cm², the increase being attributed to the greater effective area of contact between electrolyte and this more porous doped polymer compared to the doped polymer of Example 19.

EXAMPLE 21

Construction of a Battery using AsF$_5$ doped poly(2,5-dimethylphenylene sulfide).

A battery was constructed as described in Example 19 with AsF$_5$ doped poly(2,5-dimethylphenylene sulfide). An open circuit voltage of 3.4 V and a short circuit current of 1.3 mA/cm² were recorded after a short charge cycle at 8.3 volts had been applied. (The initial values were 2.5 V and 0.9 mA/cm²).

EXAMPLE 22

Preparation of Poly (thio-3,7-dibenzothiophenediyl):
3,7-dibromodibenzothiophene-5,5-dioxide:

this compound was prepared according to the method of N. M. Cullinane et al., Chem. Soc. (1963), p. 1435. Into a 500 mL round-bottomed 3-necked flask equiped with an efficient reflux condenser connected to a KOH trap via a nitrogen sweep outlet, magnetic stirring bar, and a heating mantle was placed 20 g (0.0925 mol) of dibenzothiophene-5,5-dioxide (Aldrich Chem. Co, recrystallized from ethanol, mp 134–134.5), 400 g (2.503 mol) of neat bromine and 1.0 g of iron powder. This mixture was refluxed overnight. The excess bromine was destroyed with 2 L of a 10% solution of sodium meta bisulfite at 0° C. The resulting material was washed with water, then with 95% ethanol and air dried (3.8 g crude material). Recrystallization from 3 L of acetonitrile afforded 25.8 g of dibromide containing a small amount of tribromide. Recrystallization from 3.2 L of acetonitrile afforded 18 g of material: mp 315°–318° C. Molecular ions by mass spectroscopy had molecular weights of 372, 374 and 376 (due to different isotopes of Br).

3,7-dibromodibenzothiophene:

Into a 1 L 3-necked round-bottomed flask equipted with a reflux condenser, nitrogen inlet, magnetic stirring bar and a heating mantle was place 4.63 g (0.122 mol) of LiAlH$_4$, and 600 mL of dry tetrahydrofuran (THF) (distilled from benzophenone ketyl). To this was added 18.31 g (0.0489 mol) of 3,7-dibromodibenzothiophene-5,5-dioxide. The mixture was stirred overnight at room temperature, then refluxed for 1 hour. To the cooled mixture was added 5 mL H$_2$O, 5 mL of 15% NaOH, followed by 15 mL of water. After stirring for 2 hours at room temperature the coagulated salts were filtered and washed with THF. The combined THF extracts were condensed to give 20 g of crude material. This was taken up into 1.5 L of hot ethanol, filtered and cooled. The yellow precipitate was suction filtered and air dried to give 5.2 g of 3,7-dibromodibenzothiophene: mp 174.5–176. Molecular ions by mass spectroscopy had molecular weights of 340, 342 and 344 (due to different isotopes of Br).

Poly(thio-3,7-dibenzothiophenediyl):

Into a 6 ounce (about 200 mL) glass Fisher-Porter pressure bottle equipped with a star shaped magnetic stirring bar was placed 5.0052 g (14.617 mmol) of 3,7-dibromodibenzothiophene, 1.1401 (14.617 mmol) of anhydrous Na$_2$S (Ventron Corporation), and 130 mL of distilled 1-methyl-2-pyrrolidinone. The bottle was sealed and heated with stirring to 200° C. for 48 h, then at 250° C. for 3 h. After cooling to room temperature, the pressure was released and the contents of the bottle were poured into 600 mL of anh. methanol in a blender. The polymer was filtered and washed four times with 500 mL of methanol, three times with 500 mL of water, three times with 500 mL of acetone and then with 400 mL of THF, all in a blender. The polymer was vacuum dried (at 0.1 mm of mercury or 13.3 Pa) at 100° C. for 2 h to yield 2.12 g of material (67.5%). The polymer was characterized by IR and elemental analysis. Its formula is believed to be:

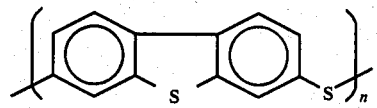

Doping poly(thio-3,7-dibensothiophenediyl):

Powdered Poly(thio-3,7-dibenzothiophenediyl) was placed in a glass vessel and evacuated. The vessel was then cooled to −78° C. and AsF$_5$ was condensed onto the polymer until it appeared wet. The polymer quickly turned blue-black. The polymer and dopant were allowed to stand for 24 hours at −78° C. The vessel was then evacuated at −78° C. and then allowed to warm to room temperature under dynamic vacuum. The sample was removed to a dry box where the weight uptake of the polymer indicated a composition C$_{12}$H$_6$S$_2$(AsF$_6$)$_{0.7}$. A pellet was pressed in the dry box and a conductivity was determined with a 4-in-line probe. The glossy blue-black pellet had a conductivity of 18.5 S/cm.

I claim:

1. An electrically conductive organic polymeric composition comprising at least one thermoplastic and/or solvent processible polymer and at least one electron acceptor or electron donor dopant or mixture thereof, which polymer has a main chain consisting essentially of (1) arylene units selected from the group consisting of paraphenylene units, meta-phenylene units, biphenylene units, naphthalene units and substituted forms thereof, and (2) interspersed between arylene units therein, regularly or irregularly along the chain, one or more chalcogen atoms or groups of such atoms; said composition having conductivity at 25° C. of at least $10^{-7}$ reciprocal ohm-cm.

2. Composition of claim 1 wherein said arylene units are poly(p-phenylene) units.

3. Composition of claim 2 wherein the dopant is an electron acceptor.

4. Composition of claim 2 wherein the dopant is an electron donor.

5. Composition of claim 1 wherein said polymer is poly(p-phenylene sulfide) and said dopant is an arsenical doping agent, chlorine, or potassium.

6. Composition of claim 5 wherein said polymer includes substantial proportions of poly(benzothiophene) units and said dopant is arsenic pentafluoride.

7. Composition of claim 1 wherein said polymer is poly(p-phenylene sulfide) and said dopant is arsenic pentafluoride.

8. Composition of claim 1 wherein said polymer is poly(m-phenylene sulfide).

9. Composition of claim 1 wherein said polymer is a monomethyl or dimethyl substitued poly(p-phenylene sulfide).

10. Composition of claim 1 wherein said polymer is poly(p-phenylene oxide).

11. Composition of claim 10 wherein the dopant is arsenic pentafluroide.

12. Composition of claim 1 wherein said polymer is poly(4'-sulfinylphenyl-4-thiophenyl).

13. Composition of claim 1 wherein said polymer contains a substantial proportion of dibenzothiophenediyl units.

14. Composition of claim 13 wherein said polymer is poly(thio-2,8-dibenzothiophenediyl).

15. Composition of claim 13 wherein said polymer is poly(thio-3,7-dibenzothiophenediyl).

16. Composition of claim 1 in the form of a film.

17. Composition of claim 1 in the form of a fiber.

18. Composition of claim 1 mixed with a further material which modifies the properties without decreasing the conductivity below $10^{-7}$ reciprocal ohm-cm.

19. Composition of claim 18 wherein the added material is a chemical compensator of the dopant.

20. Composition of claim 18 wherein the polymer is poly(p-phenylene sulfide), the dopant is arsenic pentafluoride, and the further material is arsenic trifluoride.

* * * * *